United States Patent [19]
Gailberger et al.

[11] Patent Number: 5,807,497
[45] Date of Patent: Sep. 15, 1998

[54] EFFECT COATING MATERIAL AND EFFECT COATING SYSTEM, ESPECIALLY FOR VEHICLE BODIES, USING LIQUID-CRYSTALLINE INTERFERENCE PIGMENTS

[75] Inventors: Michael Gailberger, Neu-Ulm; Peter Strohriegl, Hummeltal; Andreas Stohr, Bayeuth; Christoph Mueller-Rees, Pullach, all of Germany

[73] Assignees: Daimler-Benz AG; Wacker-Chemie GmbH, both of Stuttgart, Germany

[21] Appl. No.: 737,619

[22] PCT Filed: May 18, 1995

[86] PCT No.: PCT/EP95/01894

§ 371 Date: Jan. 21, 1997

§ 102(e) Date: Jan. 21, 1997

[87] PCT Pub. No.: WO95/32247

PCT Pub. Date: Nov. 30, 1995

[30] Foreign Application Priority Data

Mar. 24, 1994 [DE] Germany .......................... 44 18 075.6

[51] Int. Cl.⁶ .............................. C09K 19/52; C08K 5/00
[52] U.S. Cl. .................................. 252/299.01; 252/299.4; 252/299.5; 106/493; 106/499; 106/505; 106/506; 428/1
[58] Field of Search ........................... 252/299.01, 299.5, 252/299.4; 106/493, 499, 505, 506; 428/1

[56] References Cited

U.S. PATENT DOCUMENTS

| | | | |
|---|---|---|---|
| 4,388,453 | 6/1983 | Finkelmann et al. | 528/15 |
| 4,786,148 | 11/1988 | Sekimura et al. | 349/106 |
| 5,188,760 | 2/1993 | Hikmet et al. | 252/299.01 |
| 5,211,877 | 5/1993 | Andrejewski et al. | 252/299.01 |
| 5,362,315 | 11/1994 | Miller-Rees et al. | 106/493 |
| 5,438,421 | 8/1995 | Sugawara et al. | 349/123 |
| 5,442,025 | 8/1995 | Spes et al. | 528/15 |

FOREIGN PATENT DOCUMENTS

| | | |
|---|---|---|
| 0 358 208 | 3/1990 | European Pat. Off. . |
| 0 601 483 | 6/1994 | European Pat. Off. . |
| 2 133 897 | 12/1972 | France . |
| 1 372 066 | 10/1974 | United Kingdom . |
| 2 132 623 | 7/1984 | United Kingdom . |
| 91/13125 | 9/1991 | WIPO . |
| 93/12195 | 6/1993 | WIPO . |

OTHER PUBLICATIONS

Abstract DE 4,008,076 dated Mar. 14, 1990.
Abstract EP 66,137 dated Dec. 8, 1982.

*Primary Examiner*—Shean C. Wu
*Attorney, Agent, or Firm*—Evenson, McKeown, Edwards & Lenahan, PLLC

[57] ABSTRACT

The present invention discloses coated objects, such as car bodies, as well as coatings for coating such objects. In order to achieve new, hitherto unknown color effects with said coatings, at least some, and preferably only platelet-like interference pigments are mixed into the coating. When the coating is applied, the interference pigments automatically align themselves in a direction approximately parallel to the object surface. These interference pigments are made of liquid crystalline side chain polymers with a nematic and a chiral component, in which the side group mesogens are at least approximately nematic, smectic and/or cholesteric. Particularly intensive tones having a hitherto unknown brilliance may thus be obtained on a coated object, or a shimmering effect depending on the angle of incidence of light and viewing direction.

28 Claims, No Drawings

EFFECT COATING MATERIAL AND EFFECT COATING SYSTEM, ESPECIALLY FOR VEHICLE BODIES, USING LIQUID-CRYSTALLINE INTERFERENCE PIGMENTS

BACKGROUND OF THE INVENTION

The invention relates to interference pigments based on liquid-crystalline polymers. This invention also relates to an effect coating material and to commodity articles, especially motor vehicle bodies, which are painted therewith. Moreover, the invention comprises a process for the preparation of the interference pigments. Liquid-crystalline polymers are already known, for example, from DE 40 08 076 A, EP 66 137 A and U.S. Pat. No. 5,188,760.

The customary automotive solid-colour paints generally involve, incorporated into a clear vehicle comprising synthetic resin, colour pigments which determine the desired coloration of the paint. The colour effect of these pigments is based on a spectrally selective absorption effect, so that a spectrally broad fraction of the incident—white—light is absorbed by the pigments and only a spectrally narrow fraction is reflected.

In the effort for brighter perceived colours, especially for vehicle bodies, the so-called effect finishes have been developed. In the case of one group thereof, the metallic paints, small metal flakes, inter alia, as pigments are incorporated by mixing into the paint vehicle. In the case of another group, coated mica particles are used as pigments. With these effect finishes it is possible to achieve a better brightness of colour than with the solid-colour paints; moreover, depending on the direction of incidence of light and/or direction of viewing, there is a slightly altered perceived colour, which is desirable. EP 383 376 A1 describes such an effect finish, in which small mica flakes are coated uniformly on all sides with a crosslinked, liquid-crystalline polymer (LCP) in chiral nematic arrangement. The coloured appearance of such pigments comes about by means of an interference phenomenon. The only light waves of the incident light which are reflected are those whose wavelength interferes with the equidistant interplanar spacings of the liquid-crystalline polymers, whereas the light fractions of other wavelengths pass through the transparent body of the paint and are absorbed by the—preferably—dark substrate. Plateletlike interference pigments of this kind, aligned parallel to the painted surface, have a defined first colour—base colour—when viewed orthogonally and a second, shorter-wave colour when viewed from an inclined direction. This viewing angle-dependent coloured appearance of the painted surface makes the coating system highly effective, and, for specific applications in which such colour effects are perceived positively by the customer, highly desirable. A disadvantage is the complex preparation of the interference pigments, making the effect coating material and, correspondingly, the effect finish on the commodity article very costly.

The preparation of interference pigments based on polysiloxanes has become known, confidentially, to the Applicant, these pigments each consisting wholly of small fragments of a thin crosslinked film of liquid-crystalline polymer. These interference pigments are colourless and transparently see-through. The colour effect which can be achieved with them is based on the regular structure and on the uniform arrangement of the molecules in the form of a liquid crystal and on the interference, which can be traced back thereto, of a certain spectral light fraction for which the pigment has a reflective action. The other light fractions pass through the pigment. By this means it is possible to achieve stunning colour effects of different kinds, depending on the configuration of the coating system and/or on the interference pigments and mixing thereof. Aside from the novel aesthetic colour effect of the coating system and of the coating material used therefor, this coating system also offers a series of technical advantages. Owing to their chemical composition, the interference pigments have a specific weight which is approximately equal to that of the vehicle of the pigments and/or the paint base. Therefore, there is no mass-related separation of pigments and paint base during the storage of the coating material or during its application by spraying using a high-speed rotating bell, as is observed in the case of conventional painting materials containing absorption pigments—most based on metal—having high specific weights. Since, moreover, the entire colour spectrum can be produced by mixing just a few types of interference pigments in different ratios at the painting plant, stockkeeping on site can be limited to a few basic types of paints, thereby simplifying very considerably the logistics relative to the various paint colours. The interference pigments of the type discussed are obtained by knife-coating the liquid-crystalline polymers from the liquid state onto a smooth substrate, for example on to a polished roller, thereby forming a thin film. As a result of the knife-coating procedure there is an alignment of the molecules within the film, with the alignment being better the thinner the film; only after this orientation does the film exhibit an interference colour. Owing to the monomer architecture of the molecules of the liquid-crystalline polymers, equal interplanar spacings are automatically established as, consequently, are diffraction structures having a colour-selective effect, in the shearing process in the course of knife-coating.

The effective interference colour of the pigments, which are transparent and colourless per se, can be formed by adapting, in the smectic or cholesteric phases of the interference pigments, the equidistantly spaced planes, in terms of their interplanar spacings, to the wavelength of a particular coloration of the colour-defining coating layer, which can be achieved by suitable chemical structuring measures in respect of the molecular architecture. The Applicant has been able to prepare interference pigments having the basic colour red and others with the basic colour green. Advantageously it is possible to produce intermediate colours by mixing different interference pigments, together, into a base coating material, the colouring depending on the mixing ratio of the different interference pigments. Since this mixing ratio is infinitely variable, it is also possible to set, infinitely, all colour graduations for the basic shade The basic shade of the interference pigments is determined by the perceived colour, or the colour which is established when the painted surface is viewed perpendicularly under perpendicular illumination. Since, with a beam path directed diagonally to the surface, the interplanar spacings as a result of geometry—appear altered relative to the orthogonal beam direction, the perceived colour shifts towards a different colour, which in the colour spectrum is displaced in the direction of shorter wavelengths, depending on the relative direction of viewing of the surface. In other words, depending on the position of a certain part of the surface relative to the beam path of the viewer, that part of the surface appears in the basic colour or in the different, shorter-wave colour. Interference pigments of basic colour red, for example, can "flip" into the colour green; with other interference pigments, a flip in colour ("colour flop") between green and blue can be produced.

The intensity of the colours which can be perceived in this context is all the greater the darker the colour of the substrate which carries the colour-defining coating layer, although the shade of this substrate must be determined by colour pigments having an absorptive effect. The basis for this, in fact, is that the light fractions passing through the interference pigments are absorbed more or less completely by the dark substrate, and are absorbed all the more the darker the substrate. The lighter (in colour) the substrate, the greater the light fraction of the non-interfering light which is likewise reflected back from the substrate and is superimposed on the fraction of light thrown back by the interference pigments, so that the colour intensity of the latter appears paler. The lighter, therefore, the substrate, the lower the colour intensities of the basic colour. This goes so far that, on chromium-plated bright components, for example, it is absolutely impossible to achieve any colour effect, since on a mirror-like substrate there is no spectral shift in intensity in the light.

One condition for the occurrence of liquid-crystalline phases is a rigid mesogenic molecular structure. The repeating units of liquid-crystalline polymers comprise the mesogenic units. The two most frequently realized molecular structures are the side-chain LC polymers, in which the mesogenic units are chemically fixed as side chains on the polymer backbone, and the main-chain LC polymers, in which the mesogenic units form the polymer backbone, or part of the polymer backbone. In addition to the homopolymers, it is possible to prepare a large number of copolymers which may contain different mesogenic units, or mesogenic and nonmesogenic units.

SUMMARY OF THE INVENTION

EP 358 208 A2 describes liquid-crystalline organosiloxanes and their preparation, which contain (meth)acryloxy groups and which can be employed, inter alia, as pigments in paints. According to the reported example, the liquid-crystalline polymers are formed from a low molar mass nematic component, containing methacrylic groups, and of a low molar mass chiral compound, which are crosslinked. From this document, however, it is not possible to obtain any indications of how interference pigments can be produced by selecting an optimized composition of materials which has improved colour brightness.

WO 91/13125 describes pigments for paints, where plateletlike substrates are coated with one or more metal oxides, the coating comprising a chiral, irridescent liquid-crystalline medium. In accordance with the examples cited therein, the liquid-crystalline compositions consist of low molar mass chiral and nematic, P-pentyl-based and/or cholesteryl-based compounds. These classes of compounds are unsuitable for the present application case of weather-resistant and mechanically resistant coating systems.

GB 2 132 623 A discloses liquid-crystalline polymers which are obtained from low molar mass chiral cholesterol derivatives. The polymer films exhibit irridescent properties. The addition of low molar mass nematic compounds, which also include photopolymerizable groups (e.g. 4-methoxyphenyl 4-[6-methacryloyloxyhexyl-oxy] benzoate) is proposed. This document too, however, does not reveal any indications of interference pigments of the composition which is relevant or of interest in the present case.

The object of the invention, in relation to the various categories taken as the basis for the generic types, namely interference pigments, process for their preparation, coating material and coating system applied on a commodity article, is to find a material base which is independent of the base of the polysiloxanes and, in effect coating materials and effect coatings, gives rise to an improved brightness in the perceived colour, it being intended that the interference pigment used should possess an improved chemical and physical compatibility with the customary paint vehicles and should also be able to be prepared in a technically simple manner at favourable cost.

This object is achieved in accordance with the invention by interference pigments comprising liquid side chain mesogens with nematic, smectic or cholesteric orders. It is also achieved with a process for their preparation, a coating system and an applied coating system.

It is known that liquid-crystalline polymers, owing to their high molecular weight and the resulting high viscosity, possess a long orientation time. This disadvantage is avoided in accordance with the claims by the use of low molar mass mono- or difunctional acrylates, methacrylates, epoxides or vinyl ethers, which have a considerably shorter orientation time and can be crosslinked in order to "freeze in" the mesophase formed. The polymeric networks obtained in this way no longer exhibit any liquid-crystalline transitions, and until thermal decomposition they remain in a highly ordered state which is conserved. The coloured films and/or the interference pigments are obtained by admixing a low molar mass chiral compound to the nematic component, thereby inducing the formation of the chiral-nematic reflecting phase.

DESCRIPTION OF THE PREFERRED EMBODIMENTS

In this context it has been found in practice, in the course of the preparation of the colour-imparting films and/or of the pigments, that it is preferable to employ chiral compounds possessing good liquid-crystalline properties and good crosslinking properties. If a cholesteric network is prepared with nonmesogenic diacrylates, a crosslinking agent is added, for example a 1,4-diacryloyloxybenzene.

Some of the nematic and chiral components employed are available as commercial products, and/or their preparation is known from the literature. The preparation of the nematic component 1,4-diphenyl di[4-(6-acryloyloxyhexyloxy) benzoate] is described by D. J. Broer; J. Boven; G. N. Mol; G. Challa; Makromol. Chem. 190, 2255 (1989) and the preparation of the nematic component 4'-methoxybiphenyl 4-(8-acryloyloxy-3,6-dioxyoctoyloxy)benzoate has been carried out by M. Engel; B. Hisgen; R. Keller; W. Kreuder; B. Reck; H. Ringsdorf; H.-W. Schmidt; P. Tschirner; Pure and Appl. Chem. 57 (1985) 1009.

2-Octyl 4-(4-hexyloxybenzoyloxy)benzoate is marketed as a commercial product by the company Merck under the designation S 811. The chiral component cholesteryl butyrate is marketed by the company Fluka under order number 26 770. The preparation of the chiral component cholesteryl acrylate employed is described by A. C. De Visser; K. De Groot; J. Feyen; A. Brantjes; J. Polym. Sci., A-1, 9, 1893 (1971). The preparation of the chiral component cholesteryl 4-(6-acryloyloxyhexyloxy)benzoate was carried out by esterification with cholesterol via the corresponding acid chloride. The 1,4-diacryloyloxybenzene employed as crosslinking agent was prepared in accordance with L. Liebert; L. Strzelecki; D. Vagogne; Bull. Soc. Chim. Fr. 9–10, 2073 (1975).

The film produced in connection with the preparation of the interference pigments should at least after curing have a thickness of from 3 to 15 µm. In the case of thinner films, the desired interference-effective colour phenomenon is lost, and, in the case of thicker films, the alignment of the molecules is not as good, so that the colour phenomenon is impaired by a milky appearance. By breaking down the cured film in small particles, the interference pigments required in the present case are produced in platelet form, in which likewise, or as before, the side-group mesogens are in at least approximately nematic and/or smectic and/or, preferably, cholesteric order. The plateletlike interference pigments which can be used have a platelet diameter in the order of from 5 to 100 μm, or approximately from one to ten times the film thickness; larger or smaller particles produced during comminution of the fully cured film must be systematically removed, for example by sieving operations. When the basecoat pigmented with them is applied to a surface, the plateletlike pigments automatically arrange themselves parallel to the surface as a result of shear forces in the basecoat. The small particles, which tend to approximate to the cubic form, do not, however, align themselves in the applied coating material parallel to the surface of the component, which is why they should be systematically removed. The very large pigment platelets may give rise to problems during application of the coating material, which is why pigments of such a size should also be removed by sieving.

Another expedient embodiment of the coating system can be seen in keeping the substrate of the colour-defining coating layer in a shade, brought about by means of absorption pigments, which is such that it approximately coincides with the basic colour or with the "flop" colour of the interference pigments. This gives the colour coincident with the substrate a particularly intense and brilliant appearance. Although in the other viewing direction or illumination direction the colour of the coated surface also appears in the respective substrate shade, it is tinted in the other colour of the interference pigments and is strewn with finely dispersed points of sparkle. In addition, it is of course also possible, using absorption pigments, to give the substrate carrying the colour-defining coating layer neither a dark shade nor a shade in one of the colours of the interference pigments but in a third shade, which for example is in the colour spectrum between both colours or has a particularly large spectral distance from at least one of the two colours. In this way it is possible to give the coated article a three-way perceived colour.

As an alternative or else a supplement giving the substrate which carries the colour-defining coating layer a shading appropriate to its use, it is also conceivable to mix absorption pigments into the effect paint containing—in some instances possibly different—interference pigments. By admixing dark absorption pigments to the novel effect paint it is possible to obtain an impression wholly comparable with that given by a dark substrate. The situation is similar when light-coloured absorption pigments are mixed in; they bring about an attenuation of the colour flop and of the individual colour intensities. By admixing absorption pigments in one of the effect colours it is possible to achieve an intensification of this perceived colour at the expense of the colour effect of the other effect colour. The admixing of absorption pigments to the effect paint is advisable if the intention is—for whatever reason—to paint a light-coloured substrate, or even a substrate having a metallic gleam, with effect paint. A task of this kind may be required, for example, when repainting old vehicles or in the course of refinish operations.

In the text below the invention is illustrated in more detail with reference to examples.

Production of the Colour-imparting Film

The polymer films are produced in an in situ photopolymerization in the cholesteric phase of the corresponding monomer mixture. A monomer mixture consisting of 50 mol % of a nematic component and 50 mol % of a chiral component, and also approximately 1% by weight of 2,2-dimethoxy-2-phenylacetophenone, were dissolved in 1 ml of chloroform. The nematic component used was a 1,4-diphenyl di[4-(6-acryloyloxyhexyloxy)benzoate] and the chiral component used was a cholesteryl acrylate. The reaction solution was applied to a substrate, for example to a film, to a metal plate or to a slide, with a coating thickness of about 5 μm. After evaporating the solvent, the coated substrate was heated to 115° C., at which point the mesophase was formed in the monomer mixture. Good orientation was obtained by knife-coating the reaction solution onto the substrate, treating it with electrical or magnetic fields, or applying an alignment layer to the substrate beforehand. The applied film was subsequently cured by means of UV light. The cured film, when viewed straight on under perpendicular illumination, had a violet colour.

By varying the content of the two components it is possible to establish reflection colours in the entire visible region of the spectrum and in the IR range within the film, as is evident from the table below.

| Proportion of chiral monomer (mol %) | Reflection wavelength $\lambda_R$ (nm) |
|---|---|
| 10 | 1668 |
| 20 | 998.0 |
| 30 | 674.5 |
| 35 | 572.0 |
| 40 | 512.5 |
| 45 | 474.0 |
| 50 | 435.5 |
| 60 | 378.0 |
| 70 | 362.5 |

Preparation of the Interference Pigments

The colour-imparting film was scraped off from the substrate using a blade-like tool to give flake-like structures. The flakes were subsequently comminuted with an air jet mill (from Alpine); it is also possible to employ other mills, incorporating gentle heating, for plastics parts. The resulting milled material was then sieved, and a sieve fraction having a mean size of about 30 μm was used for further processing.

Preparation of the Paint

The interference pigments obtained were mixed with a clearcoat in a ratio of from 1:7 to 1:20 parts by weight. The clearcoat used was a two-component topcoat based on polyurethane; e.g. 2k-PU-decklack 0111 from BASF Lacke und Farben or a "Standox" coating material from Herberts.

Effect Finishing of a Bodywork Component

The effect paint was applied by a nematic spraying technique (equipment: SATA) to a vehicle sunroof cover which had been primed using a black filler coating, Applicant's designation DL 0404. An electrostatic application technique for the novel effect paint using high-speed rotating spraying bells appears to be another possibility. Following application, the effect paint was first dried and then subjected to force thermal curing.

The result obtained on the bodywork component was a coloured coating which, under diffuse white light—with a cloudy sky—appeared in an intense violet coloration or in a green shade depending on the direction of viewing.

Another colour-imparting film was prepared from 1,4-di (2-methyl)phenyl di[4-(6-acryloyloxy)hexyloxy]benzoate as nematic component and 2,3-cholesteryl (2-acryloyloxyethoxy)benzoate as chiral component. The film was produced by the procedure indicated in the previous example, with the difference that the coated substrate was heated to 90° C.

For this film, the following reflection wavelengths were established:

| Proportion of chiral monomer (mol %) | Reflection wavelength $\lambda_R$ (nm) |
|---|---|
| 10 | 1668 |
| 20 | 998 |
| 30 | 674 |
| 35 | 572 |
| 40 | 512 |
| 45 | 474 |
| 50 | 435 |
| 60 | 378 |
| 70 | 362 |

The advantages achieved with the subject-matter of the invention consist, in particular, in that with the effect coating material and, respectively, with the effect coating system an even higher brightness of colour, with a high degree of light stability, is achieved than it was possible to obtain with the interference pigments known to date. This can be explained by the fact that the novel interference pigments develop very narrow-band absorption curves for the various colours. Moreover, the interference pigments possess improved chemical and physical compatibility with the customary coating materials with which they are mixed. Relative to those known to date, the novel interference pigments possess a substantially higher degree of crosslinking, which is achieved in particular when the difunctional nematic diacrylates and difunctional chiral-nematic diacrylates are used. The interference pigments prepared possess high mechanical stability and great colour stability, and exhibit outstanding adhesiveness and wettability. The starting components for the liquid-crystalline side-chain polymers moreover, are simple and inexpensive to prepare.

We claim:

1. Interference pigments for colored coating materials comprising liquid-crystalline side-chain polymers, comprising side-chain mesogens having at least one of an nematic, smectic and cholesteric order, wherein:

the liquid-crystalline side-chain polymers are formed by crosslinking starting components, the starting components comprise a nematic component and a chiral component, the nematic component is selected from the group of mono- and difunctional low molar mass compounds consisting of:
1,4-diphenyl di[4-(acryloyloxy)alkyloxy]benzoates,
1,4-di(2-methyl)phenyl di[4-(acryloyloxy)alkyloxy] benzoates,
1,4-di(2-methoxy)phenyldi[4-(acryloyloxy)alkyloxy] benzoates, and
mixtures thereof, and the chiral component is selected from the group of optically isomeric low molar mass compounds having a chiral center consisting of:
3,5-cholesteryl (acryloyloxyalkoxy)benzoate,
3,4-cholesteryl (acryloyloxyalkoxy)benzoate,
2,5-cholesteryl (acryloyloxyalkoxy)benzoate,
2,4-cholesteryl (acryloyloxyalkoxy)benzoate,
β-oestra-3,17-diyl(acryloylalkyloxy)benzoate,
β-oestra-3,17-diyl acrylate,
R- or S-1,1'-bi-2-naphthoyl[4-alkoxybenzoyloxy](4,4-biphenyloyloxyalkoxyacrylate),
R- or S-1,1'-bi-2-naphthoyl[hexylterephthaloyl](4,4-biphenyloyloxyalkoxyacrylate),
1,4-diphenyl R- or S-di[4-(3-acryloyloxy-2-methylpropoxy)benzoate],
2-octyl 4-(4-hexyloxybenzoyloxy]benzoate,
1,4-dyphenyl di[4-(3-acryloyloxy-2-methylpropoxy] benzoate,
1,4-di(2-methyl)phenyl di[4-(3-acryloyloxy-2-methyl-propoxy]benzoate,
1,4-di(2-methoxy)phenyl di[4-(3-acryloyloxy-2-methyl-propoxy]benzoate,
1,4-diphenyl di[4-(1-acryloyloxy-1-methylethoxy] benzoate,
1,4-di (2-methyl)phenyl di[4-(1-acryloyloxy-1-methyl-ethoxy]benzoate,
1,4-di(2-methoxy)phenyl di[4-(1-acryloyloxy-1-methyl-ethoxy]benzoate,
1,4-diphenyl di[4-(6-acryloyloxy-3-methylhexoxy] benzoate,
1,4-di(2-methyl)phenyldi[4-(6-acryloyloxy-3-methylhexoxy]benzoate,
1,4-di(2-methoxy)phenyl di[4-(6-acryloyloxy-3-methyl-hexoxy]benzoate, and
mixtures thereof.

2. The interference pigments according to claim 1, wherein a crosslinking agent consisting of 1,4-diacryloyloxybenzene is added to the starting components.

3. The interference pigments according to claim 1, wherein the interference pigments have a thickness of from about 3 to 15 μm.

4. The interference pigments according to claim 1, wherein the interference pigments are platelet-like and have a diameter of from 5 to 100 μm.

5. The interference pigments according to claim 1, wherein the interference pigments are platelet-like and have a diameter of from 10 to 50 μm.

6. A process for the preparation of platelet-like interference pigments comprising:

producing a film of molecules having at least one of an nematic, smectic and cholesteric order by applying liquid-crystalline side-chain polymers in a liquid state to a smooth substrate, curing the film, removing the cured film from the substrate, comminuting the cured film into platelet-like particles, and separating out particles having a diameter smaller than the film thickness and particles having a diameter which is more than ten times the film thickness by a particle size-selective separation process before subsequently processing the remaining particles as interference pigments, wherein the film of liquid-crystalline side-chain polymers is applied as a solvent application or melted powder, wherein the liquid-crystalline side-chain polymers are formed by crosslinking starting components, the starting components comprise a nematic component and a chiral component, the nematic component is selected from the group of mono- and difunctional low molar mass compounds consisting of:

1,4-diphenyl di[4-(acryloyloxy)alkyloxy]benzoates,
1,4-di(2-methyl)phenyl di[4-(acryloyloxy)alkyloxy]-benzoates,
1,4-di(2-methoxy)phenyl di[4-(acryloyloxy)alkyloxy]-benzoates, and
mixtures thereof, and
the chiral component is selected from the group of optically isomeric low molar mass compounds having a chiral center consisting of:
3,5-cholesteryl (acryloyloxyalkoxy)benzoate,
3,4-cholesteryl (acryloyloxyalkoxy)benzoate,
2,5-cholesteryl (acryloyloxyalkoxy)benzoate,
2,4-cholesteryl (acryloyloxyalkoxy)benzoate,
β-oestra-3,17-diyl (acryloyloxyalkoxy)benzoate,
β-oestra-3,17-diyl acrylate,
R- or S-1,1'-bi-2-naphthoyl[4-alkoxybenzoyloxy-(4,4-biphenyloyloxyalkoxyacrylate),
R- or S-1,1'-bi-2-naphthoyl[hexylterephthaloyl]-(4,4-biphenyloyloxyalkoxyacrylate),
1,4-diphenyl R- or S-di[4-(3-acryloyloxy-2-methylpropoxy)benzoate],
2-octyl 4-(4-hexyloxybenzoyloxy]benzoate,
1,4-diphenyl di[4-(3-acryloyloxy-2-methylpropoxy]-benzoate,
1,4-di(2-methyl)phenyl di[4-(3-acryloyloxy-2-methylpropoxy]benzoate,
1,4-di(2-methoxy)phenyl di[4-(3-acryloyloxy-2-metholpropoxy]benzoate,
1,4-diphenyl di[4-(1-acryloyloxy-1-methylethoxy]benzoate,
1,4-di(2-methyl)phenyl di[4-(1-acryloyloxy-1-methyl-ethoxy]benzoate,
1,4-di(2-methoxy)phenyl di[4(1-acryloyloxy-1-methylethoxy]benzoate,
1,4-diphenyl di[4-(6-acryloyloxy-3-methylhexoxy]benzoate,
1,4-di(2-methyl)phenyl di[4-(6-acryloyloxy-3-methylhexoxy]benzoate,
1,4-di(2-methoxy)phenyl di[4-(6-acryloyloxy-3-methylhexoxy]benzoate, and
mixtures thereof.

7. The process according to claim 6, comprising adding a crosslinking agent consisting of 1,4-diacryloyloxybenzene to the starting components.

8. The process according to claim 6, comprising knife-coating the film to the substrate in a thickness of from about 3 to 15 μm.

9. The process according to claim 6, comprising processing particles having a diameter of from 5 μm to 100 μm as interference pigments.

10. The process according to claim 6, comprising processing particles having a diameter of from 10 to 50 μm as interference pigments.

11. A coating material for painting articles comprising interference pigments which are incorporated by mixing, wherein at least some of the interference pigments are platelet-like and automatically align themselves approximately parallel to the surface of the article during application of the coating material, and are composed of liquid-crystalline side-chain polymers, comprising side-chain mesogens have at least one of an nematic, smectic and cholesteric order, wherein:
the liquid-crystalline side-chain polymers are formed by crosslinking starting components,
the starting components comprise a nematic component and a chiral component,
the nematic component is selected from the group of mono- and difunctional low molar mass compounds consisting of:
1,4-diphenyl di[4-(acryloyloxy)alkyloxy]benzoates,
1,4-di(2-methyl)phenyl di[4-(acryloyloxy)alkyloxy] benzoates,
1,4-di(2-methoxy)phenyl di[4-(acryloyloxy)alkyloxy] benzoates, and
mixtures thereof, and
the chiral component is selected from the group of optically isomeric low molar mass compounds having a chiral center consisting of:
3,5-cholesteryl (acryloyloxyalkoxy)benzoate,
3,4-cholesteryl (acryloyloxyalkoxy)benzoate,
2,5-cholesteryl (acryloyloxyalkoxy)benzoate,
2,4-cholesteryl (acryloyloxyalkoxy)benzoate,
β-oestra-3,17-diyl (acryloyloxyalkoxy)benzoate,
β-oestra-3,17-diyl acrylate,
R- or S-1,1'-bi-2-naphthoyl[4-alkoxybenzoyloxy](4,4-biphenyloyloxyalkoxyacrylate),
R- or S-1,1'-bi-2-naphthoyl[hexylterephthaloyl](4,4-biphenyloyloxyalkoxyacrylate),
1,4-diphenyl R- or S-di[4-(3-acryloyloxy-2-methylpropoxy)benzoate],
2-octyl 4-(4-hexyloxybenzoyloxy]benzoate,
1,4-diphenyl di[4-(3-acryloyloxy-2-methylpropoxy] benzoate,
1,4-di(2-methyl)phenyl di[4-(3-acryloyloxy-2-methylpropoxy]benzoate,
1,4-di(2-methoxy)phenyl di[4-(3-acryloyloxy-2-methylpropoxy]benzoate,
1,4-diphenyl di[4-(1-acryloyloxy-1-methylethoxy] benzoate,
1,4-di(2-methyl)phenyl di[4-(1-acryloyloxy-1-methylethoxy]benzoate,
1,4-di(2-methoxy)phenyl di[4-(1-acryloyloxy-1-methylethoxy]benzoate,
1,4-diphenyl di[4-(6-acryloyloxy-3-methylhexoxy] benzoate,
1,4-di(2-methyl)phenyl di[4-(6-acryloyloxy-3-methylhexoxy]benzoate,
1,4-di(2-methoxy)phenyl di[4-(6-acryloyloxy-3-methylhexoxy]benzoate, and
mixtures thereof.

12. The coating material according to claim 11, wherein all the interference pigments are platelet-like.

13. Coating material according to claim 11, wherein a crosslinking agent consisting of 1,4-diacryloyloxybenzene is added to the starting components.

14. The coating material according to claim 11, wherein the interference pigments having different interplanar spacings are present and mixed in the coating material.

15. The coating material according to claim 11, wherein the interference pigments have a thickness from about 3 to 15 μm.

16. The coating material according to claim 11, wherein the platelet-like interference pigments have a diameter of from 5 to 100 μm.

17. The coating material according to claim 11, wherein the platelet-like interference pigments have a diameter of from 10 to 50 μm.

18. A vehicle body painted with a coating material according to claim 11.

19. A coating system for application to an article to define the color of the article, comprising a color-defining coating layer comprising pigments, wherein at least some of the pigments are interference pigments, wherein depending on the desired color of the article, the interference pigments are platelet-like and align themselves approximately parallel to the surface of the article and consist of crosslinked liquid-crystalline side-chain polymers, comprising side-group mesogens having at least one of an nematic, smectic and cholesteric order, wherein:
  the liquid-crystalline side-chain polymers are formed by crosslinking starting components,
  the starting components comprise a nematic component and a chiral component,
  the nematic component is selected from the group of mono- and difunctional low molar mass compounds consisting of:
    1,4-diphenyl di[4-(acryloyloxy)alkyloxy]benzoates,
    1,4-di(2-methyl)phenyl di[4-(acryloyloxy)alkyloxy] benzoates,
    1,4-di(2-methoxy)phenyldi[4-(acryloyloxy) alkyloxy] benzoates, and
    mixtures thereof, and
  the chiral component is selected from the group of optically isomeric low molar mass compounds having a chiral center consisting of:
    3,5-cholesteryl (acryloyloxyalkoxy) benzoate,
    3,4-cholesteryl (acryloyloxyalkoxy) benzoate,
    2,5-cholesteryl (acryloyloxyalkoxy)benzoate,
    2,4-cholesteryl (acryloyloxyalkoxy) benzoate,
    β-oestra-3,17-diyl (acryloyloxyalkoxy)benzoate,
    β-oestra-3,17-diyl acrylate,
    R- or S-1,1'-bi-2-naphthoyl[4-alkoxybenzoyloxy](4,4-biphenyloyloxyalkoxyacrylate),
    R- or S-1,1'-bi-2-naphthoyl[hexylterephthaloyl](4,4-biphenyloyloxyalkoxyacrylate),
    1,4-diphenyl R- or S-di[4-(3-acryloyloxy-2-methylpropoxy)benzoate],
    2-octyl 4-(4-hexyloxybenzoyloxy]benzoate,
    1,4-diphenyl di[4-(3-acryloyloxy-2-methylpropoxy] benzoate,
    1,4-di(2-methyl)phenyl di[4-(3-acryloyloxy-2-methylpropoxy]benzoate,
    1,4-di(2-methoxy)phenyl di[4-(3-acryloyloxy-2-methylpropoxy]benzoate,
    1,4-diphenyl di[4-(1-acryloyloxy-1-methylethoxy] benzoate,
    1,4-di(2-methyl)phenyl di[4-(1-acryloyloxy-1-methylethoxy]benzoate,
    1,4-di(2-methoxy)phenyl di[4-(1-acryloyloxy-1-methylethoxy]benzoate,
    1,4-diphenyl di[4-(6-acryloyloxy-3-methylhexoxy]-benzoate,
    1,4-di(2-methyl)phenyl di[4-(6-acryloyloxy-3-methylhexoxy]benzoate,
    1,4-di(2-methoxy)phenyl di[4-(6-acryloyloxy-3-methylhexoxy]benzoate, and
    mixtures thereof.

20. The coating system according to claim 19, wherein all the pigments are interference pigments.

21. The coating system according to claim 19, wherein a crosslinking agent consisting of 1,4-diacryloyloxybenzene is added to the starting components.

22. The coating system according to claim 19, wherein the color-defining coating layer comprising the interference pigments is applied to a dark colored substrate.

23. The coating system according to claim 19, wherein the color-defining coating layer comprising the interference pigments has at least two shades and is applied to a substrate having the same color as one shade of the color-defining coating layer.

24. The coating system according to claim 19, wherein interference pigments having different interplanar spacings are present and mixed in the color-defining coating layer.

25. The coating system according to claim 19, wherein the interference pigments have a thickness of from about 3 to 15 μm.

26. The coating systems according to claim 19, wherein the platelet-like interference pigments have a diameter of from about 5 to 100 μm.

27. The coating systems according to claim 19, wherein the platelet-like interference pigments have a diameter of from about 10 to 50 μm.

28. A vehicle body painted with a coating system according to claim 19.

* * * * *